United States Patent
Matsumura et al.

(10) Patent No.: US 8,808,814 B2
(45) Date of Patent: *Aug. 19, 2014

(54) LIQUID CRYSTAL COMPOSITION AND LIQUID CRYSTAL DISPLAY DEVICE

(75) Inventors: Yoshinari Matsumura, Chiba (JP); Norikatsu Hattori, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/806,849

(22) PCT Filed: Sep. 27, 2011

(86) PCT No.: PCT/JP2011/071971
§ 371 (c)(1),
(2), (4) Date: Dec. 26, 2012

(87) PCT Pub. No.: WO2012/046590
PCT Pub. Date: Apr. 12, 2012

(65) Prior Publication Data
US 2013/0112918 A1      May 9, 2013

(30) Foreign Application Priority Data
Oct. 4, 2010   (JP) ................................. 2010-224520

(51) Int. Cl.
*C09K 19/30* (2006.01)
*C09K 19/32* (2006.01)
*C09K 19/34* (2006.01)
*C09K 19/12* (2006.01)
*C09K 19/44* (2006.01)

(52) U.S. Cl.
CPC ..... *C09K 19/3066* (2013.01); *C09K 2019/3021* (2013.01); *C09K 2019/3004* (2013.01); *C09K 19/3402* (2013.01); *C09K 2019/3425* (2013.01); *C09K 2019/3036* (2013.01); *C09K 2019/122* (2013.01); *C09K 2019/3016* (2013.01); *C09K 2019/123* (2013.01); *C09K 2019/301* (2013.01); *C09K 19/44* (2013.01); *C09K 2019/3025* (2013.01)

USPC ................. 428/1.1; 252/299.61; 252/299.62; 252/299.63; 252/299.66

(58) Field of Classification Search
USPC ............... 252/299.61, 299.62, 299.63, 29.66; 428/1.1
See application file for complete search history.

(56) References Cited

U.S. PATENT DOCUMENTS

| | | | | |
|---|---|---|---|---|
| 7,767,110 B2* | 8/2010 | Fujita et al. | ............... | 252/299.01 |
| 7,914,860 B2* | 3/2011 | Fujita et al. | .................... | 428/1.1 |
| 8,399,073 B2* | 3/2013 | Klasen-Memmer et al. | .. | 428/1.1 |
| 8,632,696 B2* | 1/2014 | Saito | ......................... | 252/299.01 |
| 8,637,125 B2* | 1/2014 | Goto et al. | ..................... | 428/1.1 |
| 2012/0161072 A1* | 6/2012 | Saito et al. | ............... | 252/299.61 |
| 2013/0062560 A1* | 3/2013 | Hattori et al. | ............. | 252/299.61 |
| 2013/0207039 A1* | 8/2013 | Hattori et al. | ............. | 252/299.61 |

FOREIGN PATENT DOCUMENTS

| | | | |
|---|---|---|---|
| DE | 102008064171 | * | 7/2010 |
| JP | 2005-290349 | | 10/2005 |
| JP | 2005-314598 | | 11/2005 |
| JP | 2008-019425 | | 1/2008 |
| JP | 2008-505235 | | 2/2008 |
| JP | 2009-035630 | | 2/2009 |
| JP | 2009-270026 | | 11/2009 |
| JP | 2010285499 A | * | 12/2010 |
| WO | 2007108307 | | 9/2007 |
| WO | 2010119779 | | 10/2010 |
| WO | 2011074384 | | 6/2011 |

* cited by examiner

*Primary Examiner* — Shean C Wu
(74) *Attorney, Agent, or Firm* — Jianq Chyun IP Office

(57) ABSTRACT

The liquid crystal composition includes a specific two-ring compound having a large optical anisotropy and a small viscosity as a first component, a specific three-ring compound having a high maximum temperature and a large dielectric anisotropy as a second component, and a specific compound having a large dielectric anisotropy as a third component, and may include a specific compound having a small viscosity as a fourth component, a specific three-ring compound having a large optical anisotropy and a large dielectric anisotropy as a fifth component, and a specific compound having a large dielectric anisotropy as a sixth component, and the liquid crystal display device contains this composition.

19 Claims, No Drawings

LIQUID CRYSTAL COMPOSITION AND LIQUID CRYSTAL DISPLAY DEVICE

CROSS-REFERENCE TO RELATED APPLICATION

This application is a 371 of international application of PCT application serial no. PCT/JP2011/071971, filed on Sep. 27, 2011, which claims the priority benefit of Japan application no. 2010-224520, filed on Oct. 4, 2010. The entirety of each of the above-mentioned patent applications is hereby incorporated by reference herein and made a part of this specification.

TECHNICAL FIELD

The invention relates mainly to a liquid crystal composition suitable for use in an active matrix (AM) device and so forth, and an AM device and so forth that contain the composition. More specifically, it relates to a liquid crystal composition having negative dielectric anisotropy, and a device containing the composition and having a mode such as in-plane switching (IPS), vertical alignment (VA), fringe field switching (FFS) or polymer sustained alignment (PSA).

TECHNICAL BACKGROUND

In a liquid crystal display device, a classification based on an operating mode for liquid crystals includes modes of phase change (PC), twisted nematic (TN), super twisted nematic (STN), electrically controlled birefringence (ECB), optically compensated bend (OCB), in-plane switching (IPS), vertical alignment (VA), fringe field switching (FFS) and polymer sustained alignment (PSA). A classification based on a driving mode of the device includes a passive matrix (PM) and an active matrix (AM). The PM is further classified into static, multiplex and so forth, and the AM is classified into a thin film transistor (TFT), a metal-insulator-metal (MIM) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to give an AM device having good general characteristics. Table 1 below summarizes the relationship between the general characteristics of the two. The general characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase approximately is −10° C. or lower. The viscosity of the composition relates to the response time of the device. A short response time is desirable for displaying moving images on the device. Accordingly, a small viscosity of the composition is desirable. A small viscosity at a low temperature is more desirable.

TABLE 1

General Characteristics of Composition and AM Device

| No. | General Characteristics of Composition | General Characteristics of AM Device |
| --- | --- | --- |
| 1 | wide temperature range of a nematic phase | wide usable temperature range |
| 2 | small viscosity [1] | short response time |
| 3 | suitable optical anisotropy | large contrast ratio |
| 4 | large positive or negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1] A liquid crystal composition can be injected into a liquid crystal cell in a shorter period of time.

The optical anisotropy of the composition relates to the contrast ratio of the device. The product (Δn×d) of the optical anisotropy (Δn) of the composition and the cell gap (d) of the device is designed so as to maximize the contrast ratio. A suitable value of the product depends on the kind of operating mode. In a device having a VA mode, a suitable value is in the range of approximately 0.30 μm to approximately 0.40 μm, and in a device having an IPS mode or an FFS mode, a suitable value is in the range of approximately 0.20 μm to approximately 0.30 μm. In this case, a composition having a large optical anisotropy is desirable for a device having a small cell gap. A large absolute value of the dielectric anisotropy in the composition contributes to a low threshold voltage, small electric power consumption and a high contrast ratio of the device. Accordingly, a large absolute value of the dielectric anisotropy is desirable. A large specific resistance of the composition contributes to a large voltage holding ratio and a large contrast ratio of the device. Accordingly, it is desirable that a composition should have a large specific resistance at room temperature and also at a high temperature in the initial stage. It is desirable that a composition should have a large specific resistance at room temperature and also at a high temperature after it has been used for a long time. The stability of the composition to ultraviolet light and heat relates to the service life of the liquid crystal display device. In the case where the stability is high, the device has a long service life. Such characteristics are desirable for an AM device used in a liquid crystal projector, a liquid crystal television and so forth.

A composition having positive dielectric anisotropy is used for an AM device having a TN mode. On the other hand, a composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device having a PSA mode. Examples of the liquid crystal composition having negative dielectric anisotropy are disclosed in the following patent documents No. 1 to No. 4.

REFERENCES LIST

Patent Document

Patent document No. 1: JP 2009-270026 A.
Patent document No. 2: WO 2007-108307 A.
Patent document No. 3: JP 2008-019425 A.
Patent document No. 4: JP 2008-505235 A.

A desirable AM device has characteristics such as a wide temperature range in which the device can be used, a short response time, a large contrast ratio, a low threshold voltage, a large voltage holding ratio and a long service life. Response time that is even one millisecond shorter than that of the other devices is desirable. Thus, desirable characteristics of the composition include a high maximum temperature of a nematic phase, a low minimum temperature of a nematic phase, a small viscosity, a suitable optical anisotropy, a large positive or negative dielectric anisotropy, a large specific resistance, a high stability to ultraviolet light and a high stability to heat.

DISCLOSURE OF THE INVENTION

Subject to be Solved by the Invention

One of the aims of the invention is to provide a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. Another aim is to provide a liquid crystal composition that is suitably balanced between at least two of the characteristics and a liquid crystal composition that especially satisfies a high maximum temperature and a small viscosity. A further aim is to provide a liquid crystal display device that contains such a composition. An additional aim is to provide a composition that has characteristics such as a suitable optical anisotropy which means a large optical anisotropy or a small optical anisotropy, a large negative dielectric anisotropy and a high stability to ultraviolet light, and is to provide an AM device that has characteristics such as a short response time, a large voltage holding ratio, a large contrast ratio and a long service life.

Means for Solving the Subject

The invention concerns a liquid crystal composition that has negative dielectric anisotropy and includes at least one compound selected from the group of compounds represented by formula (1) as a first component, at least one compound selected from the group of compounds represented by formula (2) as a second component, and at least one compound selected from the group of compounds represented by formula (3) as a third component, and concerns a liquid crystal display device containing this composition:

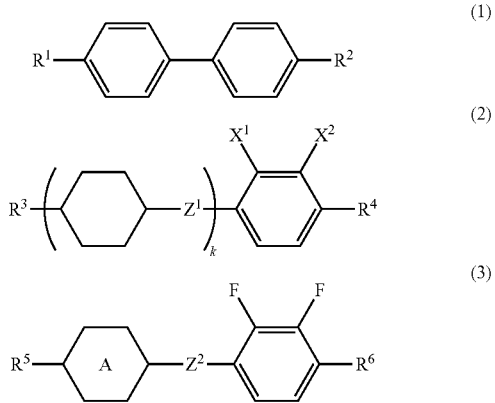

wherein $R^1$ and $R^2$ are independently alkyl having 1 to 12 carbons; $R^3$, $R^4$, $R^5$ and $R^6$ are independently alkyl having 1 to 12 carbons, alkoxy having 1 to 12 carbons or alkenyl having 2 to 12 carbons; the ring A is 1,4-cyclohexylene or 1,4-phenylene; $X^1$ and $X^2$ are independently fluorine or chlorine; $Z^1$ is independently a single bond, ethylene or methyleneoxy; $Z^2$ is a single bond or ethylene; and k is 2 or 3.

Effect of the Invention

An advantage of the invention is a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. One aspect of the invention is a liquid crystal composition that is suitably balanced between at least two of the characteristics. Another aspect is a liquid crystal display device that contains such a composition. A further aspect is a composition that has a suitable optical anisotropy, a large negative dielectric anisotropy, a high stability to ultraviolet light and so forth, and an AM device that has a short response time, a large voltage holding ratio, a large contrast ratio, a long service life and so forth.

EMBODIMENT TO CARRY OUT THE INVENTION

Usage of the terms in this specification is as follows. The liquid crystal composition of the invention and the liquid crystal display device of the invention may be abbreviated to "the composition" and "the device," respectively. A liquid crystal display device is a generic term for a liquid crystal display panel and a liquid crystal display module. "A liquid crystal compound" is a generic term for a compound having a liquid crystal phase such as a nematic phase or a smectic phase, and also for a compound having no liquid crystal phases but being useful as a component of a composition. Such a useful compound has a six-membered ring such as 1,4-cyclohexylene and 1,4-phenylene, and a rod-like molecular structure. An optically active compound and a polymerizable compound may be added to the composition. Even in the case where these compounds are liquid crystalline, the compounds are classified as an additive herein. At least one compound selected from the group of compounds represented by formula (1) may be abbreviated to "the compound (1)." "The compound (1)" means one compound, or two or more compounds represented by formula (1). The same rules apply to compounds represented by the other formulas. "Arbitrary" is used not only in cases where the position is arbitrary but also in cases where the number is arbitrary. However, it is not used in cases where the number is 0 (zero).

A higher limit of the temperature range of a nematic phase may be abbreviated to "the maximum temperature." A lower limit of the temperature range of a nematic phase may be abbreviated to "the minimum temperature." That "specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "a voltage holding ratio is large" means that a device has a large voltage holding ratio at room temperature and also at a temperature close to the maximum temperature of a nematic phase in the initial stage, and that the device has a large voltage holding ratio at room temperature and also at a temperature close to the maximum temperature of a nematic phase even after it has been used for a long time. When characteristics such as optical anisotropy are explained, values obtained according to the measuring methods that are described in Examples will be used. A first component means one compound, or two or more compounds. "The ratio of the first component" is expressed as a percentage by weight (% by weight) of the first component based on the total weight of the liquid crystal composition. The same rule applies to the ratio of a second component and so forth. The ratio of an additive mixed with the composition is expressed as a percentage by weight (% by weight) or weight parts per million (ppm) based on the total weight of the liquid crystal composition.

The symbol $R^3$ is used for a plurality of compounds in the chemical formulas of component compounds. Groups selected in $R^3$ may be the same or different in two arbitrary compounds among these. In one case, for example, $R^3$ of the compound (2) is ethyl and $R^3$ of the compound (2-1) is ethyl. In another case, $R^3$ of the compound (2) is ethyl and $R^3$ of the compound (2-1) is propyl. The same rule applies to the symbols $R^4$, $R^7$ and so forth.

The invention includes the following items.

1. A liquid crystal composition having negative dielectric anisotropy and including at least one compound selected from the group of compounds represented by formula (1) as a first component, at least one compound selected from the group of compounds represented by formula (2) as a second component, and at least one compound selected from the group of compounds represented by formula (3) as a third component:

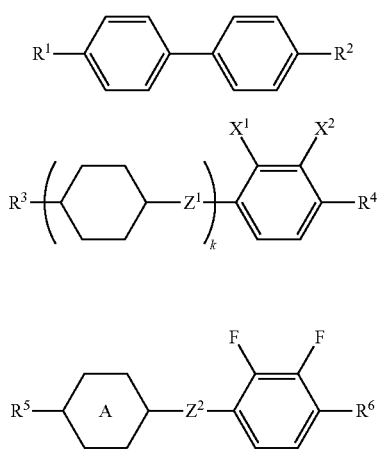

wherein $R^1$ and $R^2$ are independently alkyl having 1 to 12 carbons; $R^3$, $R^4$, $R^5$ and $R^6$ are independently alkyl having 1 to 12 carbons, alkoxy having 1 to 12 carbons or alkenyl having 2 to 12 carbons; the ring A is 1,4-cyclohexylene or 1,4-phenylene; $X^1$ and $X^2$ are independently fluorine or chlorine; $Z^1$ is independently a single bond, ethylene or methyleneoxy; $Z^2$ is a single bond or ethylene; and k is 2 or 3.

2. The liquid crystal composition according to item 1, wherein the second component is at least one compound selected from the group of compounds represented by formula (2-1) to formula (2-4), and the third component is at least one compound selected from the group of compounds represented by formula (3-1) to formula (3-3):

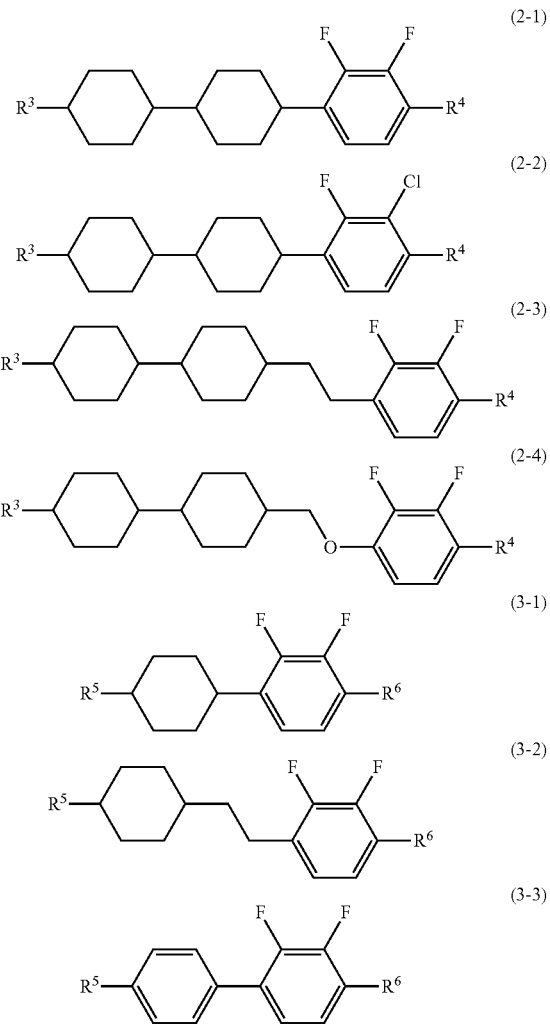

wherein $R^3$, $R^4$, $R^5$ and $R^6$ are independently alkyl having 1 to 12 carbons, alkoxy having 1 to 12 carbons or alkenyl having 2 to 12 carbons.

3. The liquid crystal composition according to item 2, wherein the second component is at least one compound selected from the group of compounds represented by formula (2-1).

4. The liquid crystal composition according to item 2, wherein the second component is at least one compound selected from the group of compounds represented by formula (2-4).

5. The liquid crystal composition according to item 2, wherein the third component is at least one compound selected from the group of compounds represented by formula (3-1).

6. The liquid crystal composition according to item 2, wherein the third component is at least one compound selected from the group of compounds represented by formula (3-3).

7. The liquid crystal composition according to any one of items 1 to 6, wherein the ratio of the first component is in the range of 5% by weight to 50% by weight, the ratio of the second component is in the range of 10% by weight to 90% by weight, and the ratio of the third component is in the range of 5% by weight to 85% by weight based on the total weight of the liquid crystal composition.

8. The liquid crystal composition according to any one of items 1 to 7, further including at least one compound selected from the group of compounds represented by formula (4) as a fourth component:

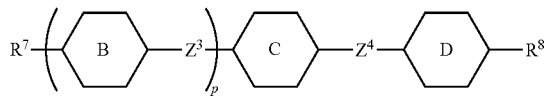
(4)

wherein $R^7$ and $R^8$ are independently alkyl having 1 to 12 carbons, alkoxy having 1 to 12 carbons, alkenyl having 2 to 12 carbons or alkenyl having 2 to 12 carbons in which arbitrary hydrogen has been replaced by fluorine; the ring B, the ring C and the ring D are independently 1,4-cyclohexylene, 1,4-phenylene, 2-fluoro-1,4-phenylene or 3-fluoro-1,4-phenylene; $Z^3$ and $Z^4$ are independently a single bond, ethylene, methyleneoxy or carbonyloxy; and p is 0, 1 or 2, and at least one of the ring C and the ring D is 1,4-cyclohexylene when p is 0.

9. The liquid crystal composition according to item 8, wherein the fourth component is at least one compound selected from the group of compounds represented by formula (4-1) to formula (4-12):

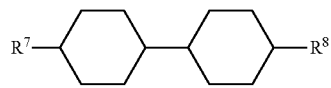
(4-1)

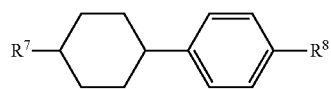
(4-2)

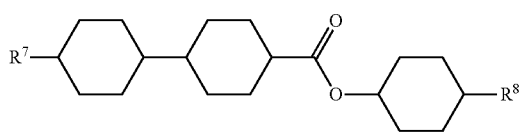
(4-3)

(4-4)

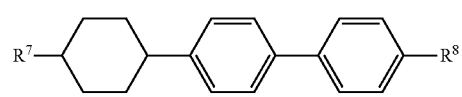
(4-5)

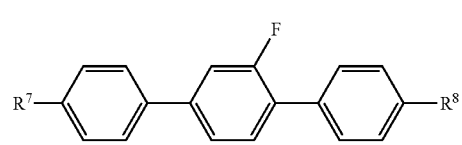
(4-6)

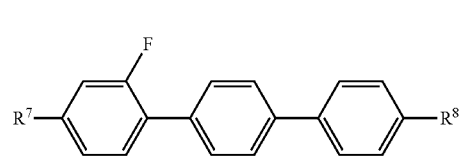
(4-7)

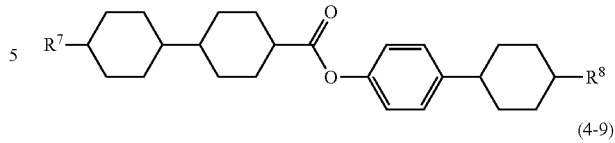
(4-8)

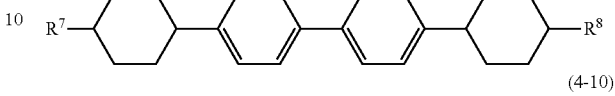
(4-9)

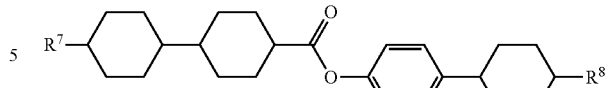
(4-10)

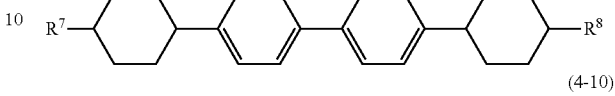
(4-11)

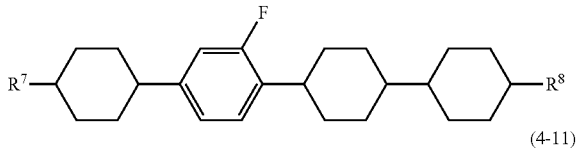
(4-12)

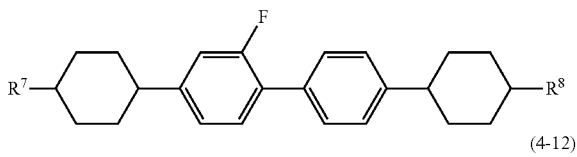

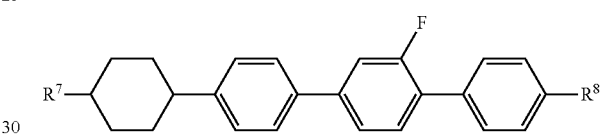

wherein $R^7$ and $R^8$ are independently alkyl having 1 to 12 carbons, alkoxy having 1 to 12 carbons, alkenyl having 2 to 12 carbons or alkenyl having 2 to 12 carbons in which arbitrary hydrogen has been replaced by fluorine.

10. The liquid crystal composition according to item 9, wherein the fourth component is at least one compound selected from the group of compounds represented by formula (4-7).

11. The liquid crystal composition according to item 9, wherein the fourth component is at least one compound selected from the group of compounds represented by formula (4-12).

12. The liquid crystal composition according to any one of items 8 to 11, wherein the ratio of the fourth component is in the range of 5% by weight to 85% by weight based on the total weight of the liquid crystal composition.

13. The liquid crystal composition according to any one of items 1 to 12, further including at least one compound selected from the group of compounds represented by formula (5) as a fifth component:

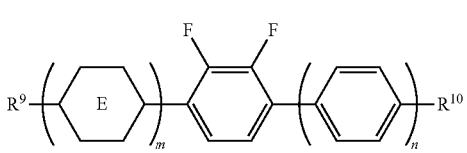
(5)

wherein $R^9$ and $R^{10}$ are independently alkyl having 1 to 12 carbons, alkoxy having 1 to 12 carbons or alkenyl having 2 to 12 carbons; the ring E is independently 1,4-cyclohexylene or 1,4-phenylene; m is 1, 2 or 3, n is 0 or 1, and the sum of m and n is 2 or 3; and at least one of the ring E is 1,4-phenylene.

14. The liquid crystal composition according to item 13, wherein the fifth component is at least one compound selected from the group of compounds represented by formula (5-1) or formula (5-2):

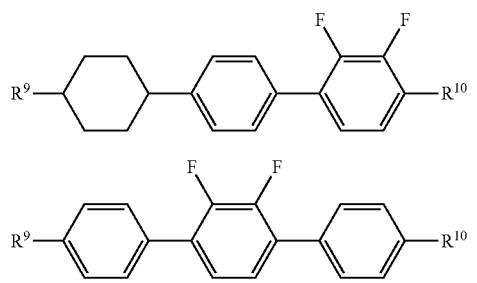

wherein $R^9$ and $R^{10}$ are independently alkyl having 1 to 12 carbons, alkoxy having 1 to 12 carbons or alkenyl having 2 to 12 carbons.

15. The liquid crystal composition according to item 14, wherein the fifth component is at least one compound selected from the group of compounds represented by formula (5-1).

16. The liquid crystal composition according to any one of items 13 to 15, wherein the ratio of the fifth component is in the range of 5% by weight to 40% by weight based on the total weight of the liquid crystal composition.

17. The liquid crystal composition according to any one of items 1 to 16, further including at least one compound selected from the group of compounds represented by formula (6) as a sixth component:

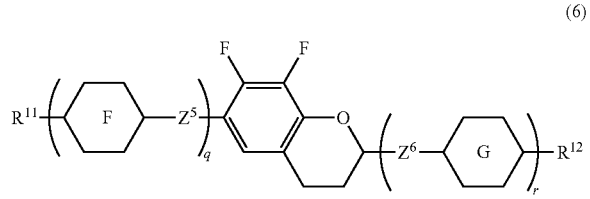

wherein $R^{11}$ and $R^{12}$ are independently alkyl having 1 to 12 carbons, alkoxy having 1 to 12 carbons or alkenyl having 2 to 12 carbons; the ring F and the ring G are independently 1,4-cyclohexylene or 1,4-phenylene; $Z^5$ and $Z^6$ are independently a single bond, ethylene, methyleneoxy or carbonyloxy; and q is 0, 1 or 2, r is 0 or 1, and the sum of q and r is 1 or 2.

18. The liquid crystal composition according to item 17, wherein the sixth component is at least one compound selected from the group of compounds represented by formula (6-1) to formula (6-5):

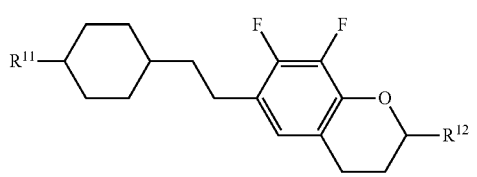
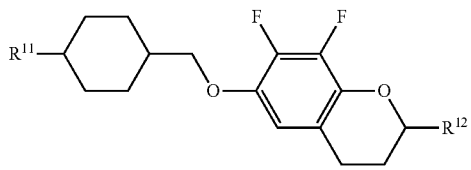
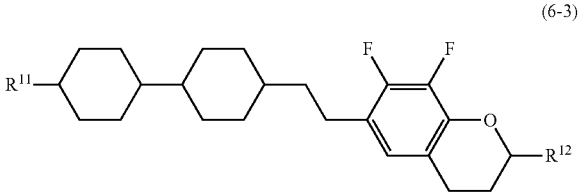
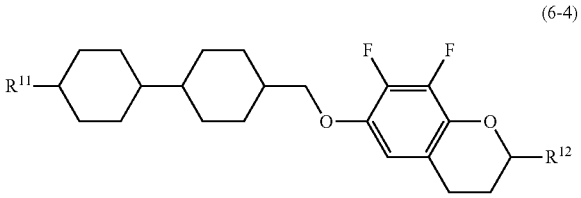
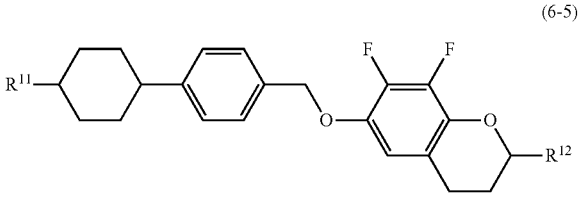

wherein $R^{11}$ and $R^{12}$ are independently alkyl having 1 to 12 carbons, alkoxy having 1 to 12 carbons or alkenyl having 2 to 12 carbons.

19. The liquid crystal composition according to item 18, wherein the sixth component is at least one compound selected from the group of compounds represented by formula (6-4).

20. The liquid crystal composition according to any one of items 17 to 19, wherein the ratio of the sixth component is in the range of 5% by weight to 40% by weight based on the total weight of the liquid crystal composition.

21. The liquid crystal composition according to any one of items 1 to 20, wherein the maximum temperature of a nematic phase is 70° C. or higher, the optical anisotropy (25° C.) at a wavelength of 589 nanometers is 0.08 or more, and the dielectric anisotropy (25° C.) at a frequency of 1 kHz is −2 or less.

22. A liquid crystal display device containing the liquid crystal composition according to any one of items 1 to 21.

23. The liquid crystal display device according to item 22, wherein an operating mode of the liquid crystal display device is a VA mode, an IPS mode, an FFS mode or a PSA mode, and a driving mode of the liquid crystal display device is an active matrix mode.

24. Use of the liquid crystal composition for the liquid crystal display device according to item 22 or 23.

The invention further includes the following items: (1) the composition described above, further including an optically active compound; (2) the composition described above, further including an additive, such as an antioxidant, an ultraviolet light absorber and an antifoaming agent; (3) an AM device containing the composition described above; (4) a device containing the composition described above and having a mode of TN, ECB, OCB, IPS, VA, FFS or PSA; (5) a transmission-type device containing the composition described above; (6) use of the composition described above, as a composition having a nematic phase; and (7) use of the composition prepared by the addition of an optically active compound to the composition described above, as an optically active composition.

The composition of the invention will be explained in the following order. First, the constitution of component compounds in the composition will be explained. Second, the main characteristics of the component compounds and the main effects of these compounds on the composition will be explained. Third, a combination of components in the composition, desirable ratios of the component compounds and the basis thereof will be explained. Fourth, a desirable embodiment of the component compounds will be explained. Fifth, specific examples of the component compounds will be shown. Sixth, additives that may be mixed with the composition will be explained. Seventh, methods for synthesizing the component compounds will be explained. Last, the use of the composition will be explained.

First, the constitution of component compounds in the composition will be explained. The compositions of the invention are classified into the composition A and the composition B. The composition A may further include any other liquid crystal compound, an additive and an impurity, in addition to the compound (1), the compound (2), the compound (3), the compound (4), the compound (5) and the compound (6). "Any other liquid crystal compound" is a liquid crystal compound that is different from the compound (1), the compound (2), the compound (3), the compound (4), the compound (5) and the compound (6). Such a compound is mixed with the composition for the purpose of further adjusting the characteristics. Of any other liquid crystal compound, a smaller amount of a cyano compound is desirable in view of its stability to heat or ultraviolet light. A more desirable ratio of the cyano compound is 0% by weight. The additive includes an optically active compound, an antioxidant, an ultraviolet light absorber, a coloring matter, an antifoaming agent, a polymerizable compound and a polymerization initiator. The impurity is compounds and so forth which have contaminated component compounds in a process such as their synthesis. Even in the case where the compound is liquid crystalline, it is classified into the impurity herein.

The composition B consists essentially of compounds selected from the group of the compound (1), the compound (2), the compound (3), the compound (4), the compound (5) and the compound (6). The term "essentially" means that the composition may include an additive and an impurity, but does not include any liquid crystal compound that is different from those compounds. The composition B has a smaller number of components than the composition A. The composition B is preferable to the composition A in view of cost reduction. The composition A is preferable to the composition B in view of the fact that physical properties can be further adjusted by adding any other liquid crystal compound.

Second, the main characteristics of the component compounds and the main effects of the compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classified according to a qualitative comparison among the component compounds, and 0 (zero) means that "a value is nearly zero."

TABLE 2

| Compounds | Characteristics of Compounds | | | | | |
| --- | --- | --- | --- | --- | --- | --- |
| | Compound (1) | Compound (2) | Compound (3) | Compound (4) | Compound (5) | Compound (6) |
| Maximum Temperature | M | M-L | M | S-L | M-L | M |
| Viscosity | S | M-L | M | S-M | M-L | L |
| Optical Anisotropy | M-L | M | M | S-L | M-L | M-L |
| Dielectric Anisotropy | 0 | L | M | 0 | M | L |
| Specific Resistance | L | L | L | L | L | L |

The main effects of the component compounds on the characteristics of the composition upon mixing the component compounds with the composition are as follows. The compound (1) decreases the minimum temperature, increases the optical anisotropy, and decreases the viscosity. The compound (2) increases the absolute value of the dielectric anisotropy, decreases the minimum temperature, and decreases the viscosity. The compound (3) increases the absolute value of the dielectric anisotropy, decreases the viscosity, and decreases the minimum temperature. The compound (4) decreases the viscosity, adjusts the optical anisotropy suitably, and decreases the minimum temperature. The compound (5) increases the optical anisotropy, increases the absolute value of the dielectric anisotropy, and decreases the minimum temperature. The compound (6) increases the absolute value of the dielectric anisotropy, and decreases the minimum temperature.

Third, a combination of the components in the composition, a desirable ratio of each component and the basis thereof will be explained. A combination of the components in the composition is the first, second and third components, the first, second, third and fourth components, the first, second, third and fifth components, the first, second, third and sixth components, the first, second, third, fourth and fifth components, the first, second, third, fourth and sixth components, the first, second, third, fifth, sixth components, and the first, second, third, fourth, fifth and sixth components.

A desirable combination of the components in the composition is the first, second, third, fourth and fifth components for increasing the maximum temperature or for decreasing the viscosity, and the first, second, third, fourth, fifth and sixth components for increasing the absolute value of the dielectric anisotropy, for decreasing the viscosity or for decreasing the minimum temperature.

A desirable ratio of the first component is approximately 5% by weight or more for increasing the optical anisotropy and for decreasing the viscosity, and is approximately 50% by weight or less for decreasing the minimum temperature. A more desirable ratio is in the range of approximately 10% by weight to approximately 35% by weight. An especially desirable ratio is in the range of approximately 15% by weight to approximately 30% by weight.

A desirable ratio of the second component is approximately 10% by weight or more for increasing the absolute value of the dielectric anisotropy, and is approximately 90% by weight or less for decreasing the minimum temperature. A more desirable ratio is in the range of approximately 15% by weight to approximately 70% by weight for decreasing the viscosity. An especially desirable ratio is in the range of approximately 20% by weight to approximately 50% by weight.

A desirable ratio of the third component is approximately 5% by weight or more for increasing the optical anisotropy and for increasing the absolute value of the dielectric anisotropy, and is approximately 85% by weight or less for decreasing the minimum temperature. A more desirable ratio is in the range of approximately 10% by weight to approximately 65% by weight. An especially desirable ratio is in the range of approximately 15% by weight to approximately 50% by weight.

A desirable ratio of the fourth component is approximately 5% by weight or more for decreasing the viscosity, and is approximately 85% by weight or less for decreasing the minimum temperature. A more desirable ratio is in the range of approximately 15% by weight to approximately 75% by weight. An especially desirable ratio is in the range of approximately 30% by weight to approximately 65% by weight.

A desirable ratio of the fifth component is approximately 5% by weight or more for increasing the absolute value of the dielectric anisotropy, and is approximately 40% by weight or less for decreasing the minimum temperature. A more desirable ratio is in the range of approximately 10% by weight to approximately 35% by weight. An especially desirable ratio is in the range of approximately 15% by weight to approximately 30% by weight.

A desirable ratio of the sixth component is approximately 5% by weight or more for increasing the absolute value of the dielectric anisotropy, and is approximately 40% by weight or less for decreasing the minimum temperature. A more desirable ratio is in the range of approximately 7% by weight to approximately 30% by weight. An especially desirable ratio is in the range of approximately 10% by weight to approximately 20% by weight.

Fourth, a desirable embodiment of the component compounds will be explained. $R^1$ and $R^2 R^4$, $R^5$, $R^6$, $R^9$, $R^{10}$, $R^{11}$ and $R^{12}$ are are independently alkyl having 1 to 12 carbons, $R^3$, independently alkyl having 1 to 12 carbons, alkoxy having 1 to 12 carbons or alkenyl having 2 to 12 carbons, $R^7$ and $R^8$ are independently alkyl having 1 to 12 carbons, alkoxy having 1 to 12 carbons, alkenyl having 2 to 12 carbons or alkenyl having 2 to 12 carbons in which arbitrary hydrogen has been replaced by fluorine.

Desirable $R^1$ or $R^2$ is alkyl having 1 to 5 carbons for decreasing the minimum temperature. More desirable $R^1$ or $R^2$ is alkyl having 1 to 3 carbons for decreasing the viscosity. Desirable $R^3$, $R^4$, $R^5$, $R^6$, $R^9$, $R^{10}$, $R^{11}$ or $R^{12}$ is alkyl having 1 to 12 carbons or alkenyl having 2 to 12 carbons for decreasing the minimum temperature or for decreasing the viscosity. More desirable $R^4$, $R^6$, $R^{10}$ or $R^{12}$ is alkoxy having 1 to 12 carbons for increasing the absolute value of the dielectric anisotropy. Desirable $R^7$ or $R^8$ is alkenyl having 2 to 12 carbons for decreasing the minimum temperature or for decreasing the viscosity, and alkyl having 1 to 12 carbons for increasing the stability to ultraviolet light or heat.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH═CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity for instance. Cis preferable in the alkenyl such as 2-butenyl, 2-pentenyl and 2-hexenyl. In the alkenyl, straight-chain alkenyl is preferable to branched-chain alkenyl.

Desirable examples of alkenyl in which arbitrary hydrogen has been replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

The alkyl does not include cyclic alkyl. The alkoxy does not include cyclic alkoxy. The alkenyl does not include cyclic alkenyl.

k is 2 or 3. Desirable k is 3 for increasing the maximum temperature, and is 2 for decreasing the viscosity.

p is 0, 1 or 2. Desirable p is 1 for increasing the optical anisotropy, and 0 for decreasing the viscosity. More desirable p is 2 for increasing the maximum temperature.

m is 1, 2 or 3, n is 0 or 1, and the sum of m and n is 2 or 3. Desirable m is 1 or 2 for decreasing the viscosity. Desirable n is 1 for increasing the optical anisotropy, and is 0 for decreasing the viscosity.

q is 0, 1 or 2, r is 0 or 1, and the sum of q and r is 1 or 2. Desirable q is 2 for increasing the maximum temperature, and is 1 for decreasing the viscosity. Desirable r is 1 for increasing the maximum temperature, and is 0 for decreasing the minimum temperature.

The ring A is 1,4-cyclohexylene or 1,4-phenylene. Desirable ring A is 1,4-cyclohexylene for decreasing the viscosity, and 1,4-phenylene for increasing the optical anisotropy.

The ring B, the ring C and the ring D are independently 1,4-cyclohexylene, 1,4-phenylene, 2-fluoro-1,4-phenylene or 3-fluoro-1,4-phenylene, and two of the ring B may be the same or different when p is 2, and at least one of the ring C and the ring D is 1,4-cyclohexylene when p is 0. Desirable ring B, ring C or ring D is 1,4-cyclohexylene for increasing the maximum temperature, and 1,4-phenylene for increasing the optical anisotropy.

The ring E is 1,4-cyclohexylene or 1,4-phenylene, and arbitrary two of the ring E may be the same or different when m is 2 or 3, and at least one of these rings E is 1,4-phenylene. Desirable ring E is 1,4-cyclohexylene for increasing the maximum temperature, and 1,4-phenylene for increasing the optical anisotropy.

The ring F and the ring G are independently 1,4-cyclohexylene or 1,4-phenylene, and two of the ring F may be the same or different when q is 2. Desirable ring F is 1,4-cyclohexylene for increasing the maximum temperature, and 1,4-phenylene for decreasing the minimum temperature. Desirable ring G is 1,4-cyclohexylene for increasing the maximum temperature. With regard to the configuration of 1,4-cyclohexylene, trans is preferable to cis for increasing the maximum temperature.

$X^1$ and $X^2$ are independently fluorine or chlorine. Desirable $X^1$ or $X^2$ is fluorine for decreasing the viscosity.

$Z^1$ is a single bond, ethylene or methyleneoxy, and arbitrary two of $Z^1$ may be the same or different when k is 2 or 3. Desirable $Z^1$ is ethylene for decreasing the viscosity, and methyleneoxy for increasing the absolute value of the dielectric anisotropy.

$Z^2$ is a single bond or ethylene. Desirable $Z^2$ is a single bond for increasing the absolute value of the dielectric anisotropy, and ethylene for decreasing the viscosity.

$Z^3$ and $Z^4$ are independently a single bond, ethylene, methyleneoxy or carbonyloxy, and arbitrary two of $Z^3$ may be the same or different when p is 2. Desirable $Z^3$ or $Z^4$ is a single bond for decreasing the viscosity, and methyleneoxy or carbonyloxy for increasing the dielectric anisotropy.

$Z^5$ and $Z^6$ are independently a single bond, ethylene, methyleneoxy or carbonyloxy, and arbitrary two of $Z^5$ may be the same or different when q is 2. Desirable $Z^5$ or $Z^6$ is a single bond for decreasing the viscosity, and methyleneoxy or carbonyloxy for increasing the dielectric anisotropy.

Fifth, specific examples of the component compounds will be shown. In the desirable compounds described below, $R^{13}$ and $R^{14}$ are independently straight-chain alkyl having 1 to 7 carbons, $R^{15}$ is straight-chain alkyl having 1 to 12 carbons or straight-chain alkenyl having 2 to 12 carbons, $R^{16}$ is straight-chain alkyl having 1 to 12 carbons, straight-chain alkoxy having 1 to 12 carbons or straight-chain alkenyl having 2 to 12 carbons.

Desirable compound (1) is the compound (1-1). Desirable compound (2) is the compound (2-1-1) to the compound (2-4-1). More desirable compound (2) is the compound (2-1-1), the compound (2-3-1) and the compound (2-4-1). Especially desirable compound is the compound (2-1-1) and the compound (2-4-1). Desirable compound (3) is the compound (3-1-1) to the compound (3-3-1). More desirable compound (3) is the compound (3-1-1) and the compound (3-3-1). Desirable compound (4) is the compound (4-1-1) to the compound (4-12-1). More desirable compound (4) is the compound (4-1-1) and the compound (4-4-1) to the compound (4-12-1). Especially desirable compound (4) is the compound (4-1-1), the compound (4-6-1), the compound (4-7-1) and the compound (4-12-1). Desirable compound (5) is the compound (5-1-1) and the compound (5-2-1). More desirable compound (5) is the compound (5-1-1). Desirable compound (6) is the compound (6-1-1) to the compound (6-5-1). More desirable compound (6) is the compound (6-4-1).

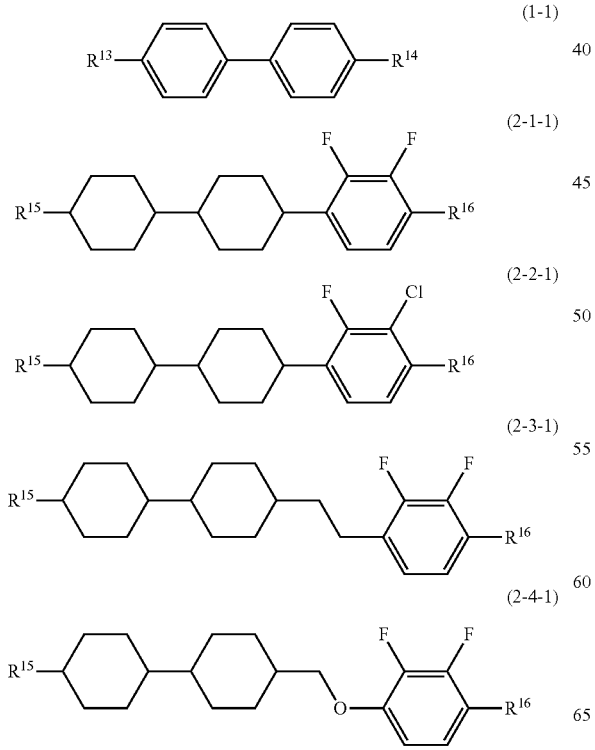

(4-10-1)
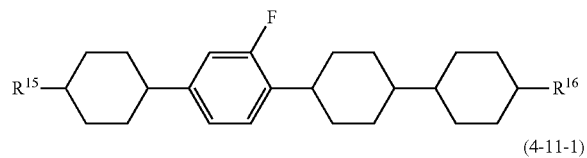

(4-11-1)
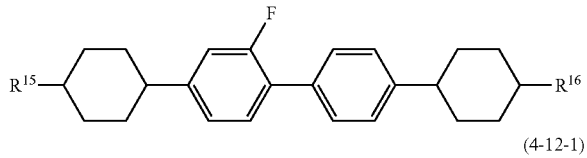

(4-12-1)
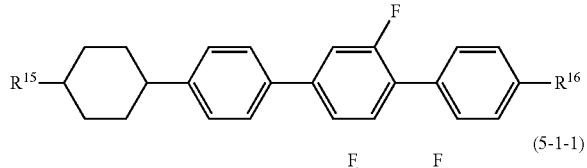

(5-1-1)
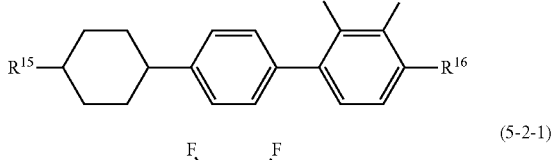

(5-2-1)
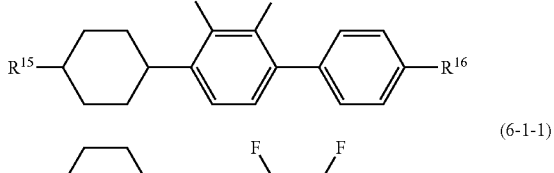

(6-1-1)
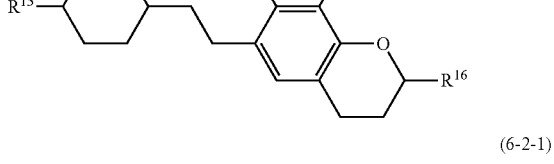

(6-2-1)
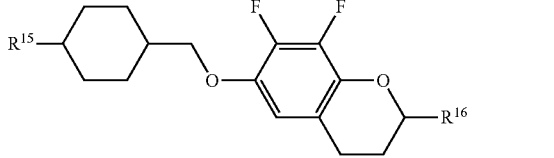

(6-3-1)
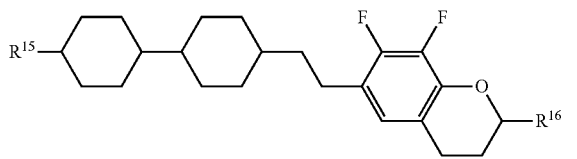

(6-4-1)
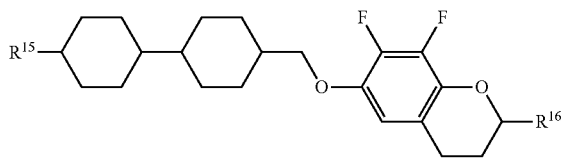

(6-5-1)
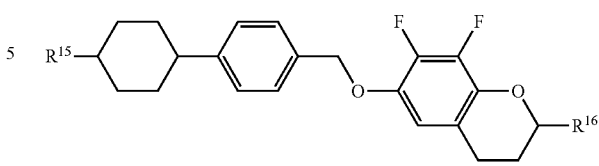

Sixth, additives which may be mixed with the composition will be explained. Such additives include an optically active compound, an antioxidant, an ultraviolet light absorber, a coloring matter, an antifoaming agent, a polymerizable compound and a polymerization initiator. The optically active compound is mixed with the composition for the purpose of inducing a helical structure and giving a twist angle in liquid crystals. Examples of such compounds include the compound (7-1) to the compound (7-4). A desirable ratio of the optically active compound is approximately 5% by weight or less, and a more desirable ratio is in the range of approximately 0.01% by weight to approximately 2% by weight.

(7-1)
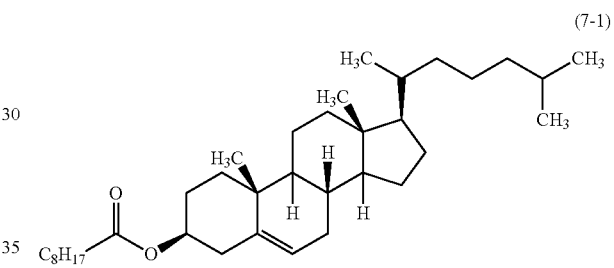

(7-2)
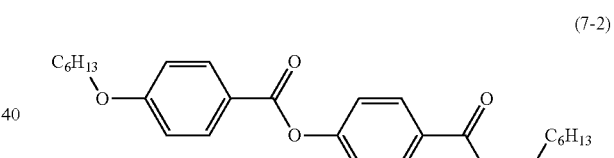

(7-3)
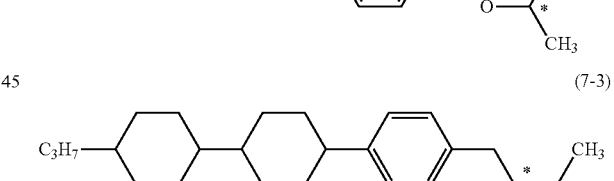

(7-4)

An antioxidant is mixed with the composition in order to prevent a decrease in specific resistance that is caused by heating under air, or to maintain a large voltage holding ratio at room temperature and also at a temperature close to the maximum temperature of a nematic phase after the device has been used for a long time.

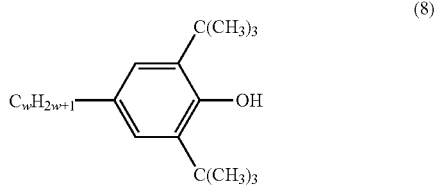

(8)

Desirable examples of the antioxidant include the compound (8) where w is an integer from 1 to 9. In the compound (8), desirable w is 1, 3, 5, 7 or 9. More desirable w is 1 or 7. The compound (8) where w is 1 is effective in preventing a decrease in specific resistance that is caused by heating under air, because it has a large volatility. The compound (8) where w is 7 is effective in maintaining a large voltage holding ratio at room temperature and also at a temperature close to the maximum temperature of a nematic phase even after the device has been used for a long time, because it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of an ultraviolet light absorber include a benzophenone derivative, a benzoate derivative and a triazole derivative. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is mixed with the composition for adjusting to a device having a guest host (GH) mode. A desirable ratio of the coloring matter is in the range of approximately 0.01% by weight to approximately 10% by weight. An antifoaming agent such as dimethyl silicone oil or methyl phenyl silicone oil is mixed with the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

A polymerizable compound is mixed with the composition for adjusting to a device having a polymer sustained alignment (PSA) mode. Desirable examples of the polymerizable compound include compounds having a polymerizable group, such as acrylates, methacrylates, vinyl compounds, vinyloxy compounds, propenyl ethers, epoxy compounds (oxiranes, oxetanes) and vinyl ketones. Especially desirable examples of the polymerizable compound are acrylate derivatives or methacrylate derivatives. A desirable ratio of the polymerizable compound is approximately 0.05% by weight or more for achieving its effect and is approximately 10% by weight or less for avoiding a poor display. A more desirable ratio is in the range of approximately 0.1% by weight to approximately 2% by weight. The polymerizable compound is polymerized on irradiation with ultraviolet light or the like, preferably in the presence of a suitable initiator such as a photopolymerization initiator. Suitable conditions for polymerization, suitable types of the initiator and suitable amounts thereof are known to a person skilled in the art and are described in the literature. For example, Irgacure 651 (registered trademark), Irgacure 184 (registered trademark) or Darocure 1173 (registered trademark) (BASF), each of which is a photopolymerization initiator, is suitable for radical polymerization. A desirable ratio of the photopolymerization initiator is in the range of approximately 0.1% by weight to approximately 5% by weight and a more desirable ratio is in the range of approximately 1% by weight to approximately 3% by weight based on the polymerizable compound.

Seventh, methods for synthesizing the component compounds will be explained. These compounds can be prepared by known methods. The synthetic methods will be exemplified as follows. The compound (1-1) is prepared by the method described in JP S52-053783 A (1977). The compound (2-1-1) is prepared by the method described in JP H02-503441 A (1990). The compound (3-1-1) is prepared by the method described in JP 2000-053602 A. The compound (4-1-1) is prepared by the method described in JP S59-070624 A (1984). The compound (5-1-1) is prepared by the method described in JP S57-114532 A (1982). The compound (6-4-1) is prepared by the method described in JP 2005-290349 A. An antioxidant is commercially available. The compound where w is 1 in formula (8) is available from Sigma-Aldrich Corporation. The compound (8) where w is 7 or the like is synthesized according to the method described in U.S. Pat. No. 3,660,505.

Compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza, in Japanese; Maruzen Co., Ltd.). The composition is prepared according to known methods using the compounds thus obtained. For example, the component compounds are mixed and dissolved in each other by heating.

Last, the use of the composition will be explained. Most of the compositions mainly have a minimum temperature of approximately −10° C. or lower, a maximum temperature of approximately 70° C. or higher, and an optical anisotropy in the range of approximately 0.07 to approximately 0.20. A device containing this composition has a large voltage holding ratio. The composition is suitable for an AM device. The composition is suitable especially for an AM device having a transmission type. The composition having an optical anisotropy in the range of approximately 0.08 to approximately 0.25 may be prepared by adjusting ratios of the component compounds or by mixing with any other liquid crystal compound. The composition can be used as a composition having a nematic phase, or as an optically active composition by the addition of an optically active compound.

The composition can be used for an AM device. It can also be used for a PM device. The composition can also be used for the AM device and the PM device having a mode such as PC, TN, STN, ECB, OCB, IPS, FFS, VA or PSA. It is especially desirable to use the composition for the AM device having the IPS, FFS or VA mode. These devices may be of a reflection type, a transmission type or a semi-transmission type. It is desirable to use the composition for a device having the transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three-dimensional network-polymer is formed in the composition.

EXAMPLES

A composition and a compound were a subject for measurement in order to evaluate characteristics of the composition and the compound to be included in the composition. When the subject for measurement was a composition, the composition itself was measured, and the value obtained was described here. When the subject for measurement was a compound, a sample for measurement was prepared by mixing 15% by weight of the compound and 85% by weight of mother liquid crystals. The characteristic values of the compound were calculated from values obtained by measurement, according to a method of extrapolation. That is: (extrapolated value)=[(measured value of a sample for measurement)−0.85×(measured value of mother liquid crystals)]/0.15. When a smectic phase (or crystals) separated out in this ratio at 25° C., the ratio of the compound to the mother liquid crystals was changed step by step in the order of (10% by weight/90% by weight), (5% by weight/95% by weight) and (1% by weight/99% by weight). The values of the maximum temperature, the optical anisotropy, the viscosity and the dielectric anisotropy with regard to the compound were obtained by this extrapolation method.

The components and ratios of the mother liquid crystals were as follows.

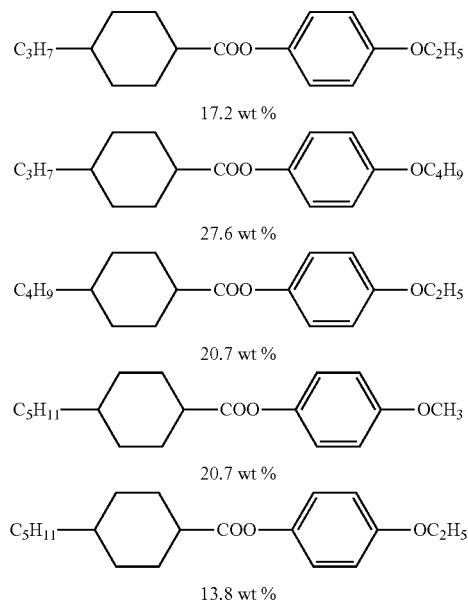

Characteristics were measured according to the following methods. Most are methods described in the Japan Electronics and Information Technology Industries Association, JEITA ED-2521B, or the modified methods.

Maximum Temperature of a Nematic Phase (NI; ° C.): A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

Minimum Temperature of a Nematic Phase (Tc; ° C.): A sample having a nematic phase was put in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as ≤−20° C. A lower limit of the temperature range of a nematic phase may be abbreviated to "the minimum temperature."

Viscosity (bulk viscosity; η; measured at 20° C.; mPa·s): Viscosity was measured by use of an E-type viscometer.

Optical Anisotropy (refractive index anisotropy; Δn; measured at 25° C.): Measurement was carried out by use of an Abbe refractometer with a polarizing plate mounted on the ocular, using light at a wavelength of 589 nanometers. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: Δn=n∥−n⊥.

Dielectric Anisotropy (Δ∈; measured at 25° C.): The value of dielectric anisotropy was calculated from the equation:

Δ∈=∈∥−∈⊥. Dielectric constants (∈∥ and ∈⊥) were measured as follows.

1) Measurement of a dielectric constant (∈∥): A solution of octadecyltriethoxysilane (0.16 mL) in ethanol (20 mL) was applied to a thoroughly cleaned glass substrate. The glass substrate was rotated with a spinner, and then heated at 150° C. for one hour. A sample was poured into a VA device in which the distance between the two glass substrates (cell gap) was 4 micrometers, and then the device was sealed with an adhesive curable with ultraviolet light. Sine waves (0.5 V, 1 kHz) were applied to the device, and a dielectric constant (∈∥) in the major axis direction of liquid crystal molecules was measured after 2 seconds.

2) Measurement of a dielectric constant (∈⊥): A polyimide solution was applied to a thoroughly cleaned glass substrate. The glass substrate was burned, and then the resulting alignment film was subjected to rubbing. A sample was poured into a TN device in which the distance between the two glass substrates (cell gap) was 9 micrometers and the twist angle was 80 degrees. Sine waves (0.5 V, 1 kHz) were applied to the device, and a dielectric constant (∈⊥) in the minor axis direction of liquid crystal molecules was measured after 2 seconds.

Threshold Voltage (Vth; measured at 25° C.; V): Measurement was carried out with an LCD evaluation system Model LCD-5100 made by Otsuka Electronics Co., Ltd. The light source was a halogen lamp. A sample was poured into a VA device having a normally black mode, in which the distance between the two glass substrates (cell gap) was 4 micrometers and the rubbing direction was antiparallel, and then the device was sealed with a UV-curable adhesive. Voltages applied to the device (60 Hz, rectangular waves) were increased stepwise from 0 V to 20 V in 0.02 V increments. The device was simultaneously irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 10% transmittance.

Voltage Holding Ratio (VHR-1; 25° C.; %): A TN device used for measurement had a polyimide-alignment film, and the distance between the two glass substrates (cell gap) was 5 micrometers. A sample was poured into the device, and then the device was sealed with an adhesive polymerizable with ultraviolet light. A pulse voltage (60 microseconds at 5 V) was applied to the TN device and the device was charged. A decreasing voltage was measured for 16.7 milliseconds with a high-speed voltmeter, and the area A between the voltage curve and the horizontal axis in a unit cycle was obtained. The area B was an area without the decrease. The voltage holding ratio was the percentage of the area A to the area B.

Voltage Holding Ratio (VHR-2; at 80° C.; %): A TN device used for measurement had a polyimide-alignment film, and the distance between the two glass substrates (cell gap) was 5 micrometer. A sample was poured into the device, and then the device was sealed with an adhesive polymerizable with ultraviolet light. A pulse voltage (60 microseconds at 5 V) was applied to the TN device and the device was charged. A decreasing voltage was measured for 16.7 milliseconds with a high-speed voltmeter and the area A between the voltage curve and the horizontal axis in a unit cycle was obtained. The area B was an area without the decrease. The voltage holding ratio was a percentage of the area A to the area B.

Voltage Holding Ratio (VHR-3; at 25° C.; %): The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

Response Time (τ; measured at 25° C.; millisecond): Measurement was carried out with an LCD evaluation system Model LCD-5100 made by Otsuka Electronics Co., Ltd. The light source was a halogen lamp. The low-pass filter was set at 5 kHz. A sample was poured into a VA device having a normally black mode, in which the cell gap between the two glass substrates was 4 micrometers, and the rubbing direction was antiparallel, and then the device was sealed with a UV-curable adhesive. Rectangular waves (60 Hz, 10 V, 0.5 second) were applied to the device. The device was simultaneously irradiated with light in the perpendicular direction, and the amount of light passing through the device was measured. The maximum amount of light corresponded to 100% transmittance, and the minimum amount of light corresponded to 0% transmittance. The response time was the period of time required for the change from 90% to 10% transmittance (fall time; millisecond).

Specific Resistance (ρ; measured at 25° C.; Ω cm): A sample (1.0 mL) was poured into a vessel equipped with electrodes. A DC voltage (10 V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

Gas Chromatographic Analysis: A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was a Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (length 50 meters, bore 0.25 millimeter, film thickness 0.25 micrometer) made by Shimadzu Corporation may also be used for the purpose of avoiding an overlap of peaks of the compounds.

The ratio of the liquid crystal compounds included in the composition may be calculated according to the following method. The liquid crystal compounds can be detected by use of a gas chromatograph. The ratio of peak areas in the gas chromatogram corresponds to the ratio (molar ratio) of the liquid crystal compounds. When the capillary columns described above are used, the correction coefficient of respective liquid crystal compounds may be regarded as 1 (one). Accordingly, the ratio (percentage by weight) of the liquid crystal compounds can be calculated from the ratio of peak areas.

The invention will be explained in detail by way of Examples. The invention is not limited by Examples described below. The compounds described in Comparative Examples and Examples were expressed as symbols according to the definition in the following Table 3. In Table 3, the configuration of 1,4-cyclohexylene is trans. A parenthesized number next to the symbol in Example corresponds to the number of the compound. The symbol (–) means any other liquid crystal compound. Ratios (percentage) of liquid crystal compounds mean the percentages by weight (% by weight) based on the total weight of the liquid crystal composition. The liquid crystal composition further includes an impurity. Last, the values of characteristics of the composition were summarized.

TABLE 3

Method of Description of Compounds using Symbols
R—(A$_1$)—Z$_1$—...—Z$_n$—(A$_n$)—R'

| | Symbol |
|---|---|
| 1) Left-terminal Group R— | |
| $C_nH_{2n+1}$— | n- |
| $C_nH_{2n+1}O$— | nO- |
| $C_mH_{2m+1}OC_nH_{2n}$— | mOn- |
| $CH_2=CH$— | V- |
| $C_nH_{2n+1}$—CH=CH— | nV- |
| $CH_2=CH$—$C_nH_{2n}$— | Vn- |
| $C_mH_{2m+1}$—CH=CH—$C_nH_{2n}$— | mVn- |
| $CF_2=CH$— | VFF- |
| $CF_2=CH$—$C_nH_{2n}$— | VFFn- |
| 2) Right-terminal Group —R' | |
| —$C_nH_{2n+1}$ | -n |
| —$OC_nH_{2n+1}$ | -On |

TABLE 3-continued

Method of Description of Compounds using Symbols
R—(A₁)—Z₁—...—Zₙ—(Aₙ)—R'

| | Symbol |
|---|---|
| —CH=CH₂ | -V |
| —CH=CH—CₙH₂ₙ₊₁ | -Vn |
| —CₙH₂ₙ—CH=CH₂ | -nV |
| —CH=CF₂ | -VFF |
| —OCₙH₂ₙ—CH=CH₂ | -OnV |

3) Bonding Group —Zₙ—

| | Symbol |
|---|---|
| —OCₙH₂ₙO— | OnO |
| —CₙH₂ₙ— | n |
| —COO— | E |
| —CH=CH— | V |
| —CH₂O— | 1O |
| —OCH₂— | O1 |
| —SiH₂— | Si |

4) Ring Structure —Aₙ—

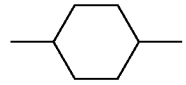 H

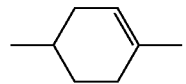 Ch

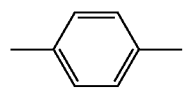 B

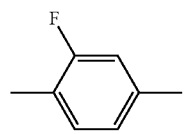 B(2F)

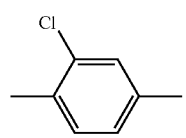 B(2CL)

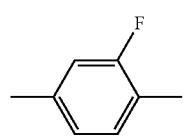 B(F)

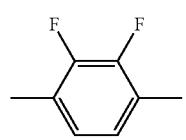 B(2F,3F)

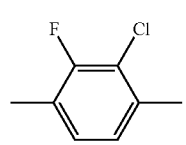 B(2F,3CL)

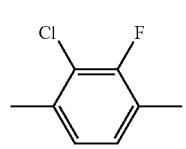 B(2CL,3F)

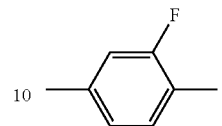 B(3F,6F)

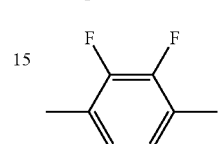 B(2F,3F,6Me)

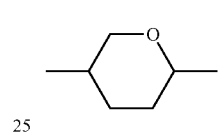 dh

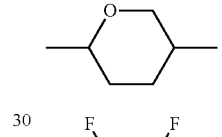 Dh

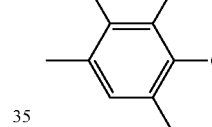 Cro(7F,8F)

5) Examples of Description

Example 1.   1-BB-3

Example 2.   3-HHB(2F,3F)-O2

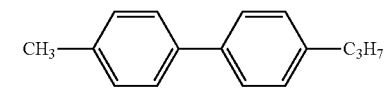

Example 3.   5-HBB(F)B-3

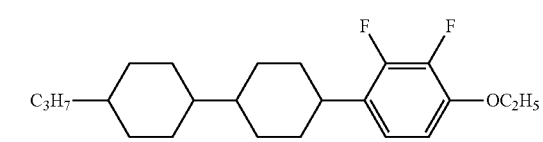

Example 4.   3-HBB(2F,3F)-O2

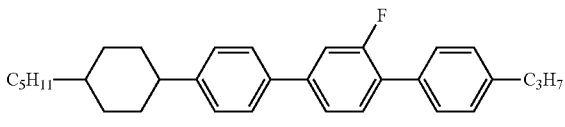

Comparative Example 1

Example 7 was selected from the compositions disclosed in JP 2009-270026 A. The basis of the selection was that this composition consisted of the compound (1), the compound (3), the compound (4) and the compound (5). The components and characteristics of the composition were as follows.

| | | |
|---|---|---|
| 1-BB-5 | (1-1) | 3% |
| V-HB(2F,3F)-O2 | (3-1-1) | 10% |
| V-HB(2F,3F)-O4 | (3-1-1) | 10% |
| 5-BB(2F,3F)-O2 | (3-3-1) | 5% |
| 3-HH-V | (4-1-1) | 25% |
| 3-HH-V1 | (4-1-1) | 7% |
| V2-BB(F)B-3 | (4-6-1) | 3% |
| 3-HBBH-5 | (4-9-1) | 3% |
| 5-HBB(F)B-3 | (4-12-1) | 6% |
| 3-HBB(2F,3F)-O2 | (5-1-1) | 10% |
| 5-HBB(2F,3F)-O2 | (5-1-1) | 9% |
| 3-H1OB(2F,3F)B(2F,3F)-O4 | (—) | 3% |
| 5-H1OB(2F,3F)B(2F,3F)-O4 | (—) | 3% |
| 5-HH1OB(2F,3F)B(2F,3F)-O4 | (—) | 3% |

NI = 82.2° C.; Tc ≤ −20° C.; Δn = 0.113; η = 25.7 mPa · s; Δε = −2.9; Vth = 2.31 V.

Example 1

The compound (−) in Comparative example 1 that is similar to the compound (2-4-1) was replaced by the compound (2-4-1). This composition was prepared, and measured according to the method described above. The components and characteristics of the composition were as follows. Example 1 has a higher maximum temperature and a smaller viscosity in comparison with Comparative example 1.

| | | |
|---|---|---|
| 1-BB-5 | (1-1) | 3% |
| V-HB(2F,3F)-O2 | (3-1-1) | 10% |
| V-HB(2F,3F)-O4 | (3-1-1) | 10% |
| 5-BB(2F,3F)-O2 | (3-3-1) | 5% |
| 3-HH-V | (4-1-1) | 25% |
| 3-HH-V1 | (4-1-1) | 7% |
| V2-BB(F)B-3 | (4-6-1) | 3% |
| 3-HBBH-5 | (4-9-1) | 3% |
| 5-HBB(F)B-3 | (4-12-1) | 6% |
| 3-HBB(2F,3F)-O2 | (5-1-1) | 10% |
| 5-HBB(2F,3F)-O2 | (5-1-1) | 9% |
| 5-HH1OB(2F,3F)-O2 | (2-4-1) | 9% |

NI = 84.3° C.; Tc ≤ −20° C.; Δn = 0.110; η = 19.6 mPa · s; Δε = −2.8; VHR-1 = 99.1%; VHR-2 = 97.9%; VHR-3 = 97.9%.

Comparative Example 2

Example 5 was selected from the compositions disclosed in JP 2008-019425 A. The basis of the selection was that this composition consisted of a compound similar to the compound (1), the compound (2), the compound (3), the compound (4) and the compound (5). The components and characteristics of the composition were as follows.

| | | |
|---|---|---|
| 3-BB-O2 | similar to (1) | 13% |
| 5-BB-O2 | similar to (1) | 5% |
| 3-HH2B(2F,3F)-O2 | (2-3-1) | 10% |
| 4-HH2B(2F,3F)-O2 | (2-3-1) | 6% |
| 5-HH2B(2F,3F)-O2 | (2-3-1) | 6% |
| 3-H2B(2F,3F)-O2 | (3-2-1) | 14% |
| 3-H2B(2F,3F)-O4 | (3-2-1) | 7% |
| 5-H2B(2F,3F)-O2 | (3-2-1) | 14% |
| 2-BB(F)B-3 | (4-6-1) | 5% |
| 5-HBB(F)B-2 | (4-12-1) | 4% |
| 5-HBB(F)B-3 | (4-12-1) | 4% |
| 3-HBB(2F,3F)-O2 | (5-1-1) | 8% |
| 5-HBB(2F,3F)-O2 | (5-1-1) | 4% |

NI = 83.0° C.; Tc ≤ −20° C.; Δn = 0.127; η = 28.3 mPa · s; Δε = −2.8; Vth = 2.57 V.

Comparative Example 3

The compound (1-1) in Example 1 was replaced by a compound similar to the compound (1) in Comparative example 2. This composition was prepared, and measured according to the method described above. The components and characteristics of the composition were as follows. Comparative example 3 has a larger viscosity in comparison with Example 1.

| | | |
|---|---|---|
| 5-BB-O2 | similar to (1) | 3% |
| V-HB(2F,3F)-O2 | (3-1-1) | 10% |
| V-HB(2F,3F)-O4 | (3-1-1) | 10% |
| 5-BB(2F,3F)-O2 | (3-3-1) | 5% |
| 3-HH-V | (4-1-1) | 25% |
| 3-HH-V1 | (4-1-1) | 7% |
| V2-BB(F)B-3 | (4-6-1) | 3% |
| 3-HBBH-5 | (4-9-1) | 3% |
| 5-HBB(F)B-3 | (4-12-1) | 6% |
| 3-HBB(2F,3F)-O2 | (5-1-1) | 10% |
| 5-HBB(2F,3F)-O2 | (5-1-1) | 9% |
| 5-HH1OB(2F,3F)-O2 | (2-4-1) | 9% |

Tc ≤ −20° C.; Δn = 0.111; η = 20.6 mPa · s; Δε = −2.8.

Comparative Example 4

Example M8 was selected from the compositions disclosed in JP 2008-505235 A. The basis of the selection was that this composition consisted of the compound (1), the compound (3), the compound (4) and the compound (5). This composition was prepared, and measured according to the method described above. The components and characteristics of the composition were as follows.

| | | |
|---|---|---|
| 1-BB-4 | (1-1) | 7% |
| 3-BB(2F,3F)-O2 | (3-3-1) | 19% |
| 5-BB(2F,3F)-O2 | (3-3-1) | 17% |
| 3-HH-V1 | (4-1-1) | 12% |
| V-HHB-1 | (4-4-1) | 10% |
| 3-HBB-2 | (4-5-1) | 10% |
| 2-HBB(2F,3F)-O2 | (5-1-1) | 12% |
| 3-HBB(2F,3F)-O2 | (5-1-1) | 13% |

NI = 72.3° C.; Tc ≤ −10° C.; Δn = 0.147; η = 20.3 mPa · s; Δε = −3.4.

Example 2

| | | |
|---|---|---|
| 1-BB-3 | (1-1) | 8% |
| 1-BB-5 | (1-1) | 7% |
| 3-BB-5 | (1-1) | 9% |
| 4-HHB(2F,3F)-O2 | (2-1-1) | 5% |
| 5-HHB(2F,3F)-O2 | (2-1-1) | 5% |
| 2-HHB(2F,3F)-1 | (2-1-1) | 3% |
| 2-HHB(2F,3CL)-O2 | (2-2-1) | 3% |
| 3-HH1OB(2F,3F)-O2 | (2-4-1) | 8% |
| 5-HH1OB(2F,3F)-O2 | (2-4-1) | 8% |
| 5-HB(2F,3F)-O2 | (3-1-1) | 9% |
| 1V2-HB(2F,3F)-O2 | (3-1-1) | 5% |
| 3-H2B(2F,3F)-O4 | (3-2-1) | 4% |

-continued

| | | |
|---|---|---|
| 2-HH-5 | (4-1-1) | 3% |
| 3-HH-O1 | (4-1-1) | 5% |
| 3-HB-O2 | (4-2-1) | 3% |
| 3-HHB-O1 | (4-4-1) | 5% |
| 3-HHEBH-3 | (4-8-1) | 4% |
| 3-HHEBH-4 | (4-8-1) | 3% |
| 3-HHEBH-5 | (4-8-1) | 3% |

NI = 84.6° C.; Tc ≤ −20° C.; Δn = 0.101; η = 18.3 mPa·s; Δε = −3.2; VHR-1 = 99.6%; VHR-2 = 98.1%; VHR-3 = 97.9%.

Example 3

| | | |
|---|---|---|
| 1-BB-5 | (1-1) | 3% |
| 2-BB-3 | (1-1) | 5% |
| 2-BB-4 | (1-1) | 7% |
| 3-BB-5 | (1-1) | 5% |
| 2-HHB(2F,3F)-O2 | (2-1-1) | 3% |
| 3-HHB(2F,3F)-1 | (2-1-1) | 5% |
| V-HHB(2F,3F)-O2 | (2-1-1) | 4% |
| 3-HHB(2F,3CL)-O2 | (2-2-1) | 5% |
| 5-HH2B(2F,3F)-O2 | (2-3-1) | 7% |
| 3-HH1OB(2F,3F)-O2 | (2-4-1) | 5% |
| 4-HH1OB(2F,3F)-O2 | (2-4-1) | 5% |
| 5-HH1OB(2F,3F)-O2 | (2-4-1) | 5% |
| V-HB(2F,3F)-O2 | (3-1-1) | 6% |
| 3V-HB(2F,3F)-O2 | (3-1-1) | 8% |
| 2-HH-3 | (4-1-1) | 5% |
| 3-HB-O1 | (4-2-1) | 5% |
| V-HHB-1 | (4-4-1) | 5% |
| 3-HBB-2 | (4-5-1) | 4% |
| 3-HHEBH-3 | (4-8-1) | 3% |
| 5-HBB(F)B-3 | (4-12-1) | 5% |

NI = 85.0° C.; Tc ≤ −20° C.; Δn = 0.108; η = 18.7 mPa·s; Δε = −3.1; VHR-1 = 99.5%; VHR-2 = 98.3%; VHR-3 = 97.8%.

Example 4

| | | |
|---|---|---|
| 2-BB-3 | (1-1) | 7% |
| 3-BB-5 | (1-1) | 8% |
| 1V2-HHB(2F,3F)-O2 | (2-1-1) | 3% |
| 3-HH2B(2F,3F)-O2 | (2-3-1) | 8% |
| 3-HH1OB(2F,3F)-O2 | (2-4-1) | 7% |
| 5-HH1OB(2F,3F)-O2 | (2-4-1) | 5% |
| 3-HH1OB(2F,3F)-1 | (2-4-1) | 4% |
| 3-H2B(2F,3F)-O2 | (3-2-1) | 8% |
| 3-BB(2F,3F)-O2 | (3-3-1) | 8% |
| 3-HH-V | (4-1-1) | 10% |
| 3-HH-V1 | (4-1-1) | 3% |
| 2-BB(F)B-3 | (4-6-1) | 7% |
| 5-B(F)BB-3 | (4-7-1) | 3% |
| 5-HBB(F)B-2 | (4-12-1) | 3% |
| 3-HBB(2F,3F)-O2 | (5-1-1) | 5% |
| 5-HBB(2F,3F)-O2 | (5-1-1) | 5% |
| 1V2-HBB(2F,3F)-O2 | (5-1-1) | 3% |
| 2-BB(2F,3F)B-4 | (5-2-1) | 3% |

NI = 84.5° C.; Tc ≤ −20° C.; Δn = 0.137; η = 18.7 mPa·s; Δε = −3.5; VHR-1 = 99.6%; VHR-2 = 98.6%; VHR-3 = 98.0%.

Example 5

| | | |
|---|---|---|
| 1-BB-3 | (1-1) | 8% |
| 5-HH2B(2F,3F)-O2 | (2-3-1) | 10% |
| 5-HH1OB(2F,3F)-O2 | (2-4-1) | 8% |
| 3-H2B(2F,3F)-O4 | (3-2-1) | 5% |
| 3-HH-V | (4-1-1) | 24% |
| 1-HH-2V1 | (4-1-1) | 5% |

-continued

| | | |
|---|---|---|
| 3-HH-VFF | (4-1) | 2% |
| 3-HHEH-5 | (4-3-1) | 4% |
| 3-HBB-2 | (4-5-1) | 5% |
| 5-HBB(2F,3F)-O2 | (5-1-1) | 8% |
| 1V2-HBB(2F,3F)-O2 | (5-1-1) | 3% |
| 2-BB(2F,3F)B-4 | (5-2-1) | 6% |
| 3-H2Cro(7F,8F)-5 | (6-1-1) | 3% |
| 3-H1OCro(7F,8F)-5 | (6-2-1) | 3% |
| 3-HH1OCro(7F,8F)-5 | (6-4-1) | 6% |

NI = 83.7° C.; Tc ≤ −20° C.; Δn = 0.104; η = 18.5 mPa·s; Δε = −3.1; VHR-1 = 99.6%; VHR-2 = 98.1%; VHR-3 = 97.7%.

Example 6

| | | |
|---|---|---|
| 3-BB-5 | (1-1) | 8% |
| 3-HHB(2CL,3F)-O2 | (2) | 3% |
| 3-HH1OB(2F,3F)-O2 | (2-4-1) | 7% |
| 3-HH1OB(2F,3F)-1 | (2-4-1) | 3% |
| 3-BB(2F,3F)-O2 | (3-3-1) | 8% |
| V2-BB(2F,3F)-O2 | (3-3-1) | 3% |
| 1V2-BB(2F,3F)-O2 | (3-3-1) | 5% |
| 3-HH-V | (4-1-1) | 16% |
| 3-HH-2V1 | (4-1-1) | 6% |
| 3-HH-VFF | (4-1) | 7% |
| 3-HHB-O1 | (4-4-1) | 3% |
| 5-B(F)BB-2 | (4-7-1) | 5% |
| 3-HHEBH-3 | (4-8-1) | 3% |
| 3-HBBH-3 | (4-9-1) | 3% |
| 5-HBB(2F,3F)-O2 | (5-1-1) | 8% |
| 1V2-HBB(2F,3F)-O2 | (5-1-1) | 3% |
| 5-HB1OCro(7F,8F)-5 | (6-5-1) | 4% |
| 4O-Cro(7F,8F)H-3 | (6) | 5% |

NI = 83.4° C.; Tc ≤ −20° C.; Δn = 0.119; η = 18.6 mPa·s; Δε = −3.0; VHR-1 = 99.1%; VHR-2 = 98.0%; VHR-3 = 97.5%.

Example 7

| | | |
|---|---|---|
| 2-BB-3 | (1-1) | 5% |
| 3-BB-5 | (1-1) | 5% |
| 3-HHB(2CL,3F)-O2 | (2) | 3% |
| 3-HH1OB(2F,3F)-O2 | (2-4-1) | 7% |
| 5-HH1OB(2F,3F)-O2 | (2-4-1) | 7% |
| 3-HB(2F,3F)-O2 | (3-1-1) | 10% |
| V-HB(2F,3F)-O2 | (3-1-1) | 5% |
| 5-H2B(2F,3F)-O2 | (3-2-1) | 5% |
| 3-HH-V | (4-1-1) | 5% |
| 3-HH-2V1 | (4-1-1) | 7% |
| 3-HH-VFF | (4-1) | 7% |
| 5-HB-3 | (4-2-1) | 3% |
| V2-B(F)BB-3 | (4-7-1) | 3% |
| 2-B(F)BB-2V | (4-7-1) | 3% |
| 5-HB(F)HH-V | (4-10-1) | 3% |
| 5-HB(F)BH-5 | (4-11-1) | 3% |
| 3-HBB(2F,3F)-O2 | (5-1-1) | 8% |
| V2-HBB(2F,3F)-O2 | (5-1-1) | 8% |
| 3-HH2Cro(7F,8F)-5 | (6-3-1) | 3% |

NI = 83.1° C.; Tc ≤ −20° C.; Δn = 0.114; η = 18.2 mPa·s; Δε = −3.1; VHR-1 = 99.1%; VHR-2 = 98.2%; VHR-3 = 97.6%.

Example 8

| | | |
|---|---|---|
| 1-BB-3 | (1-1) | 8% |
| 1-BB-5 | (1-1) | 3% |
| 3-BB-5 | (1-1) | 8% |
| V-HHB(2F,3F)-O2 | (2-1-1) | 5% |
| V2-HHB(2F,3F)-O2 | (2-1-1) | 3% |

-continued

| | | |
|---|---|---|
| 3-HH1OB(2F,3F)-O2 | (2-4-1) | 8% |
| 5-HH1OB(2F,3F)-O2 | (2-4-1) | 6% |
| 3-BB(2F,3F)-O2 | (3-3-1) | 8% |
| 5-BB(2F,3F)-O2 | (3-3-1) | 8% |
| 5-HH-V | (4-1-1) | 5% |
| 3-HH-V1 | (4-1-1) | 5% |
| 3-HH-2V1 | (4-1-1) | 5% |
| 3-BB(F)B-2V | (4-6-1) | 3% |
| V2-B(F)BB-3 | (4-7-1) | 3% |
| 2-B(F)BB-2V | (4-7-1) | 3% |
| V-HBB(2F,3F)-O2 | (5-1-1) | 8% |
| V2-HBB(2F,3F)-O2 | (5-1-1) | 8% |
| 1O1-HBBH-5 | (—) | 3% |

NI = 83.4° C.; Tc ≤ -20° C.; Δn = 0.140; η = 17.7 mPa·s; Δε = -3.0; VHR-1 = 99.3%; VHR-2 = 98.3%; VHR-3 = 98.3%.

Example 9

| | | |
|---|---|---|
| 1-BB-7 | (1-1) | 6% |
| 2-BB-4 | (1-1) | 6% |
| 3-BB-5 | (1-1) | 8% |
| 2-HHB(2F,3F)-O2 | (2-1-1) | 5% |
| V-HHB(2F,3F)-O2 | (2-1-1) | 3% |
| V2-HHB(2F,3F)-O2 | (2-1-1) | 7% |
| 1V2-HHB(2F,3F)-O2 | (2-1-1) | 3% |
| 3-HH1OB(2F,3F)-O2 | (2-4-1) | 8% |
| 4-HH1OB(2F,3F)-O2 | (2-4-1) | 7% |
| 5-HH1OB(2F,3F)-O2 | (2-4-1) | 5% |
| 5-H2B(2F,3F)-O2 | (3-2-1) | 5% |
| 3-HH-V | (4-1-1) | 7% |
| 5-HH-V | (4-1-1) | 8% |
| 7-HB-1 | (4-2-1) | 3% |
| 2-BB(F)B-5 | (4-6-1) | 3% |
| V2-BB(F)B-3 | (4-6-1) | 3% |
| 3-HBB(2F,3F)-O2 | (5-1-1) | 5% |
| V2-HBB(2F,3F)-O2 | (5-1-1) | 8% |

NI = 85.7° C.; Tc ≤ -20° C.; Δn = 0.114; η = 17.3 mPa·s; Δε = -3.1; VHR-1 = 99.4%; VHR-2 = 98.5%; VHR-3 = 98.2%.

The compositions in Examples 1 to 9 have a high maximum temperature and a small viscosity in comparison with those in Comparative examples 1 to 4. Therefore, the liquid crystal composition of the invention has more excellent characteristics than that shown in Patent documents 1 to 4.

INDUSTRIAL APPLICABILITY

The invention provides a liquid crystal composition that satisfies at least one of characteristics such as a high maximum temperature of a nematic phase, a low minimum temperature of a nematic phase, a small viscosity, a large optical anisotropy, a large negative dielectric anisotropy, a large specific resistance, a high stability to ultraviolet light and a high stability to heat, or that is suitably balanced between at least two of the characteristics. A liquid crystal display device containing such a composition becomes an AM device that has a short response time, a large voltage holding ratio, a large contrast ratio, a long service life and so forth, and thus it can be used for a liquid crystal projector, a liquid crystal television and so forth.

What is claimed is:

1. A liquid crystal composition having negative dielectric anisotropy and comprising at least one compound selected from the group of compounds represented by formula (1) as a first component, at least one compound selected from the group of compounds represented by formula (2) as a second component, and at least one compound selected from the group of compounds represented by formula (3) as a third component:

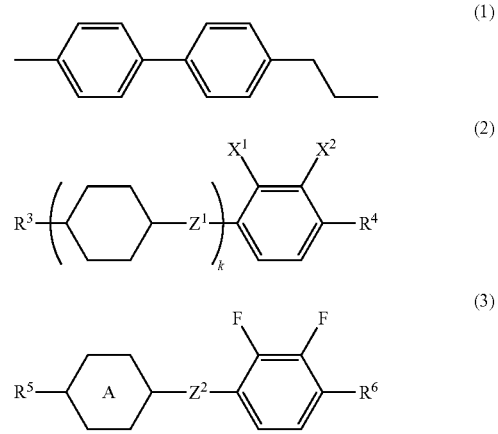

wherein $R^3$, $R^4$, $R^5$ and $R^6$ are independently alkyl having 1 to 12 carbons, alkoxy having 1 to 12 carbons or alkenyl having 2 to 12 carbons; the ring A is 1,4-cyclohexylene or 1,4-phenylene; $X^1$ and $X^2$ are independently fluorine or chlorine; $Z^1$ is independently a single bond, ethylene or methyleneoxy; $Z^2$ is a single bond or ethylene; and k is 2 or 3.

2. The liquid crystal composition according to claim 1, wherein the second component is at least one compound selected from the group of compounds represented by formula (2-1) to formula (2-4), and the third component is at least one compound selected from the group of compounds represented by formula (3-1) to formula (3-3):

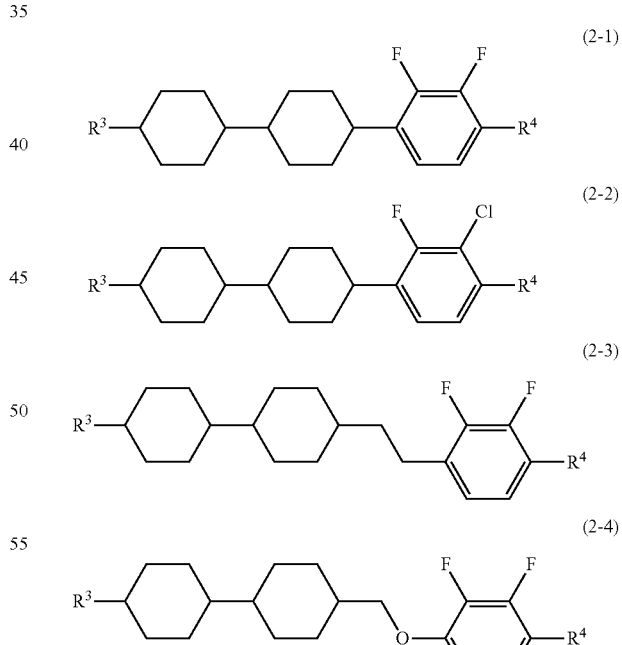

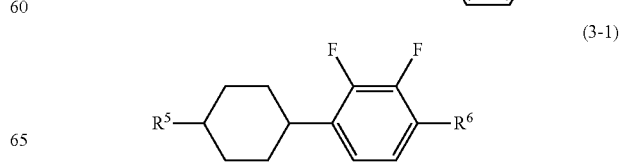

-continued

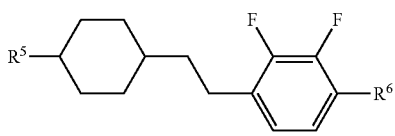
(3-2)

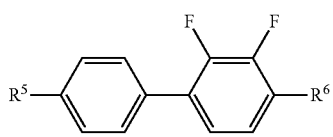
(3-3)

wherein $R^3$, $R^4$, $R^5$ and $R^6$ are independently alkyl having 1 to 12 carbons, alkoxy having 1 to 12 carbons or alkenyl having 2 to 12 carbons.

3. The liquid crystal composition according to claim 2, wherein the second component is at least one compound selected from the group of compounds represented by formula (2-1).

4. The liquid crystal composition according to claim 2, wherein the second component is at least one compound selected from the group of compounds represented by formula (2-4).

5. The liquid crystal composition according to claim 2, wherein the third component is at least one compound selected from the group of compounds represented by formula (3-3).

6. The liquid crystal composition according to claim 1, wherein the ratio of the first component is in the range of 5% by weight to 50% by weight, the ratio of the second component is in the range of 10% by weight to 90% by weight, and the ratio of the third component is in the range of 5% by weight to 85% by weight based on the total weight of the liquid crystal composition.

7. The liquid crystal composition according to claim 1, further comprising at least one compound selected from the group of compounds represented by formula (4) as a fourth component:

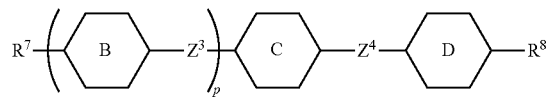
(4)

wherein $R^7$ and $R^8$ are independently alkyl having 1 to 12 carbons, alkoxy having 1 to 12 carbons, alkenyl having 2 to 12 carbons or alkenyl having 2 to 12 carbons in which arbitrary hydrogen has been replaced by fluorine; the ring B, the ring C and the ring D are independently 1,4-cyclohexylene, 1,4-phenylene, 2-fluoro-1,4-phenylene or 3-fluoro-1,4-phenylene; $Z^3$ and $Z^4$ are independently a single bond, ethylene, methyleneoxy or carbonyloxy; and p is 0, 1 or 2, and at least one of the ring C and the ring D is 1,4-cyclohexylene when p is 0.

8. The liquid crystal composition according to claim 7, wherein the fourth component is at least one compound selected from the group of compounds represented by formula (4-1) to formula (4-12):

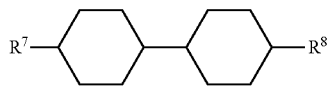
(4-1)

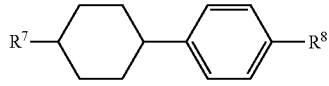
(4-2)

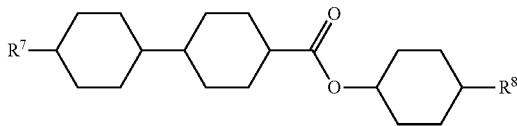
(4-3)

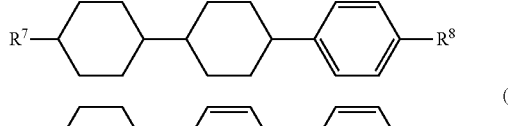
(4-4)

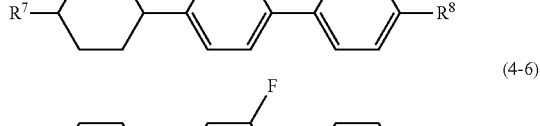
(4-5)

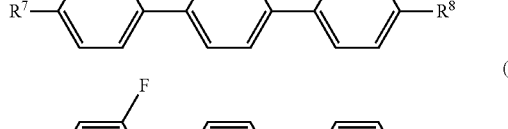
(4-6)

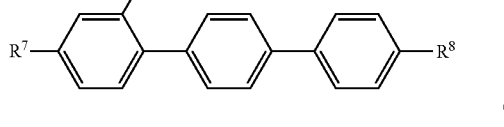
(4-7)

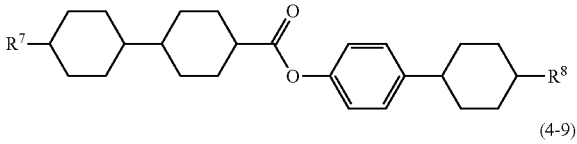
(4-8)

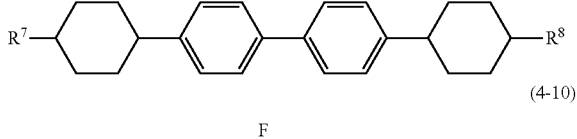
(4-9)

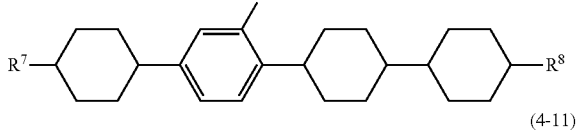
(4-10)

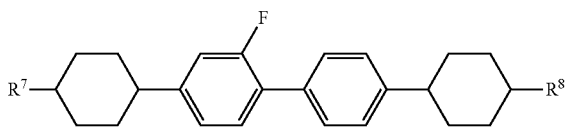
(4-11)

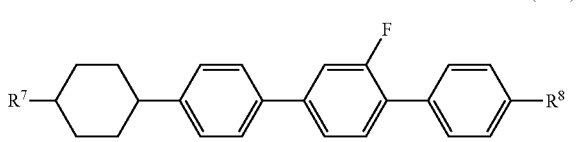
(4-12)

wherein $R^7$ and $R^8$ are independently alkyl having 1 to 12 carbons, alkoxy having 1 to 12 carbons, alkenyl having 2 to 12 carbons or alkenyl having 2 to 12 carbons in which arbitrary hydrogen has been replaced by fluorine.

9. The liquid crystal composition according to claim 8, wherein the fourth component is at least one compound selected from the group of compounds represented by formula (4-7).

10. The liquid crystal composition according to claim 7, wherein the ratio of the fourth component is in the range of 5% by weight to 85% by weight based on the total weight of the liquid crystal composition.

11. The liquid crystal composition according to claim 7, further comprising at least one compound selected from the group of compounds represented by formula (5) as a fifth component:

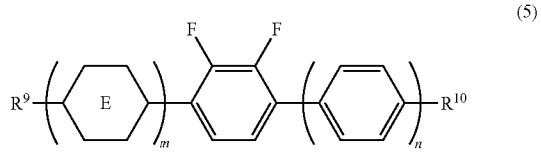
(5)

wherein $R^9$ and $R^{10}$ are independently alkyl having 1 to 12 carbons, alkoxy having 1 to 12 carbons or alkenyl having 2 to 12 carbons; the ring E is independently 1,4-cyclohexylene or 1,4-phenylene; m is 1, 2 or 3, n is 0 or 1, and the sum of m and n is 2 or 3; and at least one of the ring E is 1,4-phenylene.

12. The liquid crystal composition according to claim 11, wherein the fifth component is at least one compound selected from the group of compounds represented by formula (5-1) or formula (5-2):

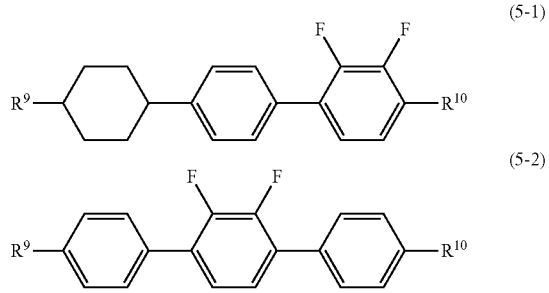
(5-1)

(5-2)

wherein $R^9$ and $R^{10}$ are independently alkyl having 1 to 12 carbons, alkoxy having 1 to 12 carbons or alkenyl having 2 to 12 carbons.

13. The liquid crystal composition according to claim 11, wherein the ratio of the fifth component is in the range of 5% by weight to 40% by weight based on the total weight of the liquid crystal composition.

14. The liquid crystal composition according to claim 11, further comprising at least one compound selected from the group of compounds represented by formula (6) as a sixth component:

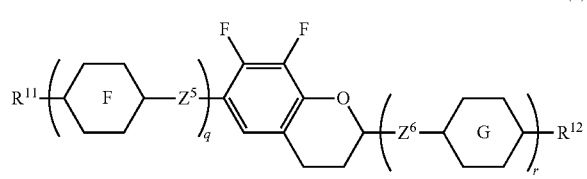
(6)

wherein $R^{11}$ and $R^{12}$ are independently alkyl having 1 to 12 carbons, alkoxy having 1 to 12 carbons or alkenyl having 2 to 12 carbons; the ring F and the ring G are independently 1,4-cyclohexylene or 1,4-phenylene; $Z^5$ and $Z^6$ are independently a single bond, ethylene, methyleneoxy or carbonyloxy; and q is 0, 1 or 2, r is 0 or 1, and the sum of q and r is 1 or 2.

15. The liquid crystal composition according to claim 14, wherein the sixth component is at least one compound selected from the group of compounds represented by formula (6-1) to formula (6-5):

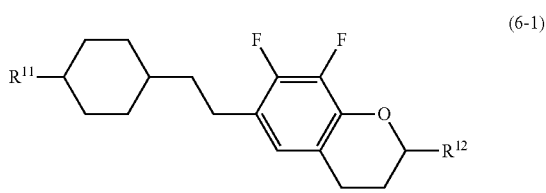
(6-1)

(6-2)

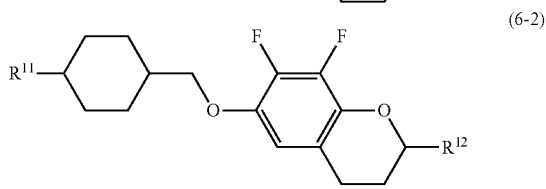
(6-3)

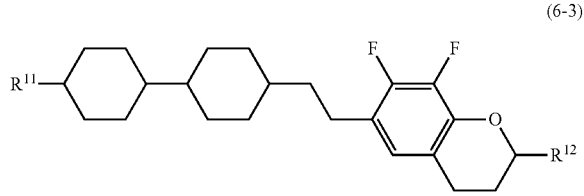
(6-4)

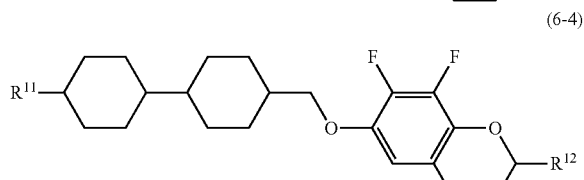
(6-5)

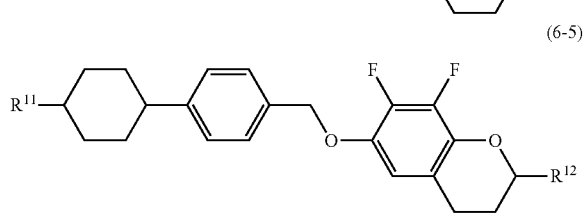

wherein $R^{11}$ and $R^{12}$ are independently alkyl having 1 to 12 carbons, alkoxy having 1 to 12 carbons or alkenyl having 2 to 12 carbons.

16. The liquid crystal composition according to claim 14, wherein the ratio of the sixth component is in the range of 5% by weight to 40% by weight based on the total weight of the liquid crystal composition.

17. The liquid crystal composition according to claim 1, wherein the maximum temperature of a nematic phase is 70° C. or higher, the optical anisotropy (25° C.) at a wavelength of 589 nanometers is 0.08 or more, and the dielectric anisotropy (25° C.) at a frequency of 1 kHz is −2 or less.

18. A liquid crystal display device containing the liquid crystal composition according to claim 1.

19. The liquid crystal display device according to claim 18, wherein an operating mode of the liquid crystal display device is a VA mode, an IPS mode, an FFS mode or a PSA mode, and a driving mode of the liquid crystal display device is an active matrix mode.

* * * * *